United States Patent
Krogh et al.

(10) Patent No.: US 8,764,082 B2
(45) Date of Patent: Jul. 1, 2014

(54) ARRANGEMENT FOR LIFTING A TOWER WALL PORTION OF A WIND TURBINE AND METHOD FOR LIFTING A TOWER WALL PORTION OF A WIND TURBINE

(75) Inventors: Mikkel Verner Krogh, Brande (DK); Henning Poulsen, Skjern (DK)

(73) Assignee: Siemens Aktiengesellschaft, Munich (DE)

( * ) Notice: Subject to any disclaimer, the term of this patent is extended or adjusted under 35 U.S.C. 154(b) by 331 days.

(21) Appl. No.: 13/166,099

(22) Filed: Jun. 22, 2011

(65) Prior Publication Data
US 2011/0318159 A1    Dec. 29, 2011

(30) Foreign Application Priority Data
Jun. 29, 2010   (EP) ..................... 10167604

(51) Int. Cl.
*B66C 1/00* (2006.01)
(52) U.S. Cl.
USPC ............................. 294/67.33; 294/93; 294/90
(58) Field of Classification Search
CPC .............. B66C 1/54; B66C 1/32; B66C 1/66; B66C 1/625; B66C 1/108; B25J 15/103; B25J 15/0253
USPC .......... 294/67.33, 81.54, 81.62, 195, 207, 93, 294/119.1, 90
See application file for complete search history.

(56) References Cited

U.S. PATENT DOCUMENTS

| | | | |
|---|---|---|---|
| 1,717,006 A | | 6/1929 | Cartwright |
| 1,804,843 A | * | 5/1931 | Santiago ......................... 29/262 |
| 2,670,983 A | * | 3/1954 | Breslav ...................... 294/81.54 |
| 3,905,632 A | | 9/1975 | Caylor et al. |
| 4,252,358 A | | 2/1981 | Klebs |
| 4,611,377 A | * | 9/1986 | McCormick et al. ...... 29/407.05 |
| 5,141,274 A | * | 8/1992 | Hayden et al. ..................... 294/2 |
| 5,403,057 A | * | 4/1995 | Sugito et al. ............... 294/119.1 |
| 5,618,157 A | * | 4/1997 | Pratt et al. ...................... 414/723 |
| 5,873,615 A | * | 2/1999 | McCullough ................. 294/106 |
| 5,997,064 A | * | 12/1999 | Orita .......................... 294/119.1 |
| 6,135,704 A | * | 10/2000 | Seaberg ..................... 414/791.6 |
| 7,634,890 B2 | * | 12/2009 | Maj et al. ..................... 52/749.1 |
| 2004/0115035 A1 | | 6/2004 | Tygard |
| 2009/0044482 A1 | | 2/2009 | Tooman |
| 2011/0067353 A1 | * | 3/2011 | Tadayon .................... 52/745.18 |
| 2011/0221215 A1 | * | 9/2011 | Botwright .................... 294/81.4 |

FOREIGN PATENT DOCUMENTS

| | | |
|---|---|---|
| FR | 2 576 007 A1 | 7/1986 |
| JP | 04041389 A | 2/1992 |
| JP | 10205428 A | 8/1998 |
| SU | 1523522 A1 | 11/1989 |
| WO | WO 2008/000262 A1 | 1/2008 |

* cited by examiner

*Primary Examiner* — Dean Kramer
*Assistant Examiner* — Gabriela Puig

(57) ABSTRACT

An arrangement for lifting a tower wall portion of a wind turbine is provided. The arrangement includes a bar, a first holding member and a second holding member. The bar is connectable to a coupling element of a lift. The first and second holding members have respective first and second engagement portions adapted for engaging the tower wall portion at a first position and a second position respectively, the first position being different from the second position. The first and second holding members are releasably lockable at the bar such that the first engagement portion and the second engagement portion are a first distance away from each other. The first and second holding members are also releasably lockable at the bar such that the first engagement portion and the second engagement portion are a second distance away from each other, the second distance being different from the first distance.

7 Claims, 8 Drawing Sheets

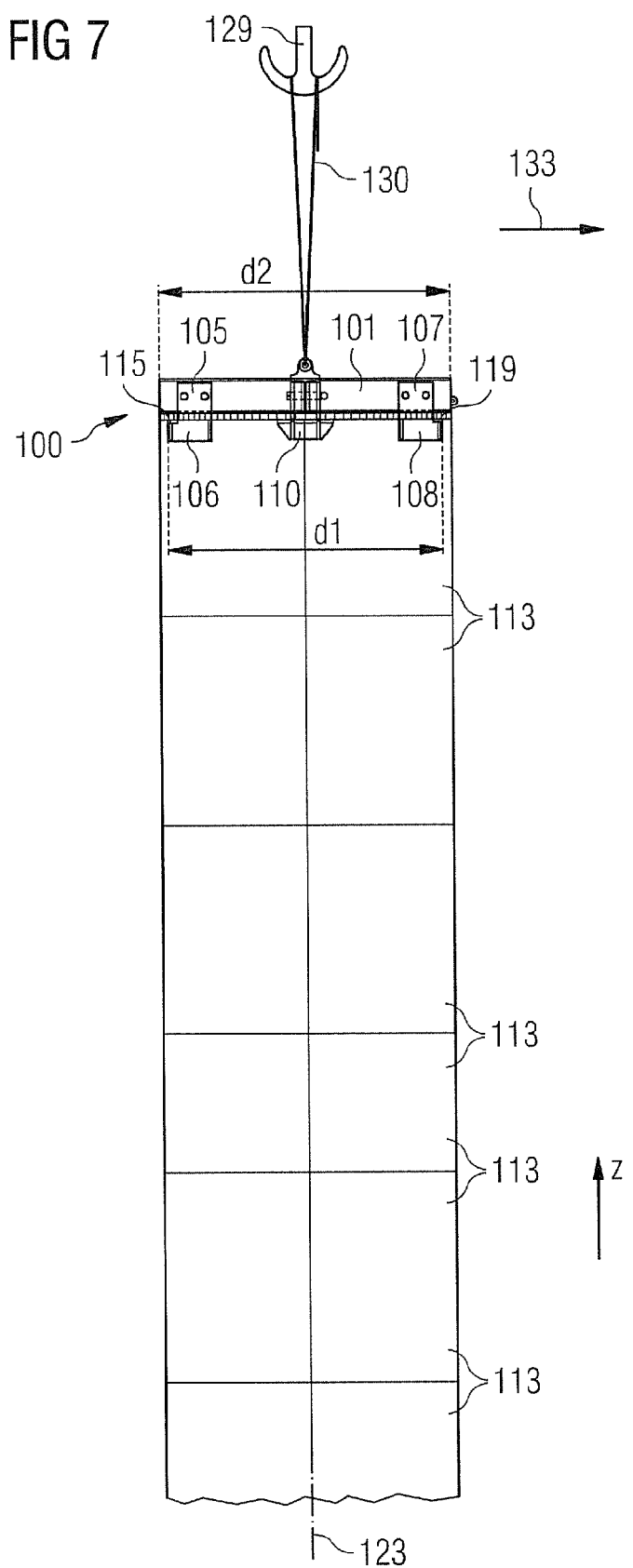

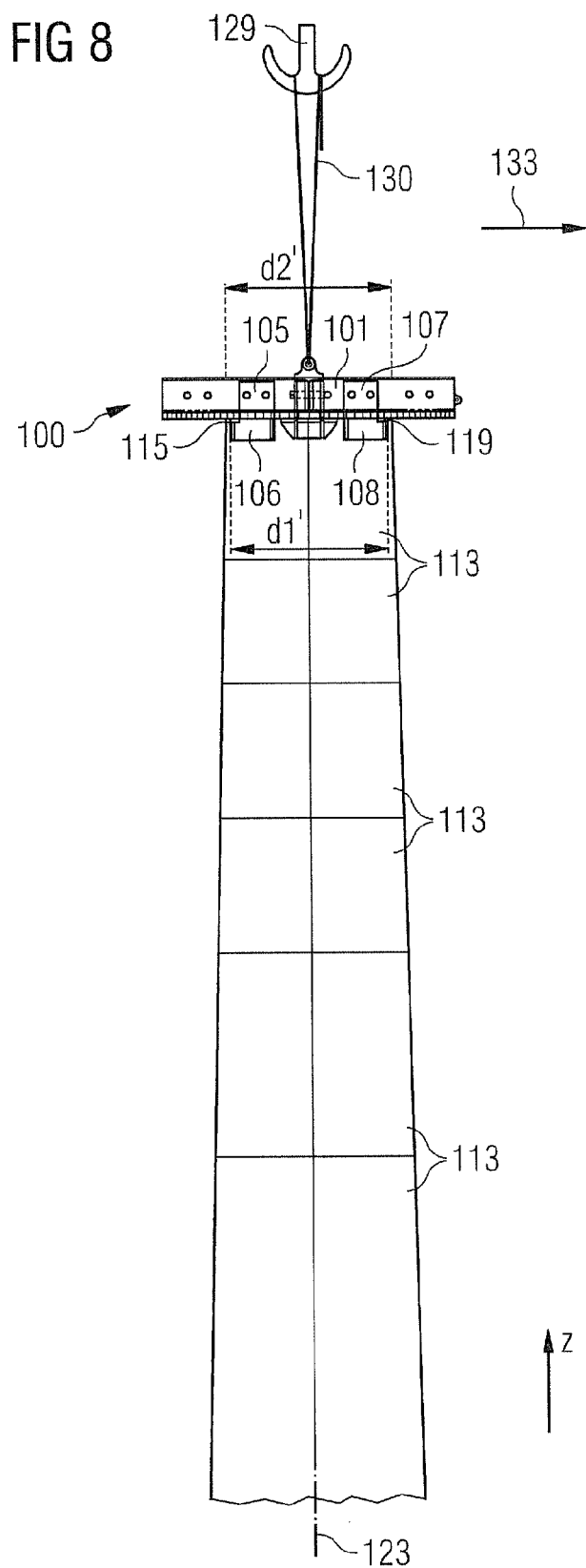

ARRANGEMENT FOR LIFTING A TOWER WALL PORTION OF A WIND TURBINE AND METHOD FOR LIFTING A TOWER WALL PORTION OF A WIND TURBINE

CROSS REFERENCE TO RELATED APPLICATIONS

This application claims priority of European Patent Office application No. 10167604.7 EP filed Jun. 29, 2010, which is incorporated by reference herein in its entirety.

FIELD OF INVENTION

The present invention relates to an arrangement for lifting a tower wall portion of a wind turbine and to a method for lifting a tower wall portion of a wind turbine. In particular, the present invention relates to an arrangement and to a method for lifting a tower wall portion of a wind turbine, which are suitable for assembling a tower wall of a wind turbine comprising of tower wall portions having different diameters.

ART BACKGROUND

WO 2008/000262 discloses lifting equipment for handling a wind turbine component, wherein a standard lifting bracket is connected by several bolts to an end flange of a tower section.

When a large tower of a wind turbine is erected and installed, each tower section has to be lifted up by a crane starting from a bottom tower section, e.g. on top of a foundation, where the following tower sections are placed on top of each other. The lifting bracket disclosed in WO 2008/000262 has to be attached to an end part of the wind turbine tower wall. After lifting and assembling a first tower wall section to an already installed tower section or foundation the lifting bracket has to be removed from the first tower wall section and mounted again to a second tower section which is to be connected on top of the first tower wall section. This may be very time-consuming.

Usually, the lifting bracket or similar lifting means are attached to an end part of a tower section by bolts or similar connecting means. Often, this is manually done by a technician. Thereby, it may be necessary that the technician has to climb up the already assembled tower sections, has to detach the lifting means in order to remove them from the erected tower sections, has to climb down the tower and attach it to a further tower section to be assembled to the already established tower portion. This may be very time-consuming, as the technician has to climb up, involving in particular to be lifted up by a crane or an installed elevator inside, the tower. In particular, the lifting means may be very large and heavy which may complicate detaching the lifting means, removing it from the already established tower portion and attaching it to a tower section to be assembled on top of the already established tower portion.

There may be a need for an arrangement and for a method for lifting a tower wall portion of a wind turbine which enables a simplified way of assembling a wind turbine tower wall from several (in particular annular) tower sections or tower portions, wherein the assembly process may be shortened compared to a conventional process for assembling a tower wall of a wind turbine.

Further, there may be a need for an arrangement and a method for lifting a tower wall portion of a wind turbine, which is suitable for lifting tower wall portions having different sizes, in particular different diameters. In particular, there may be a need for an arrangement or a method for lifting a tower wall portion of a wind turbine, which is suitable for assembling a tower wall of a wind turbine comprised of several tower portions having different sizes, in particular different diameters.

SUMMARY OF THE INVENTION

This need may be met by the subject matter according to the independent claims. Advantageous embodiments of the present invention are described by the dependent claims.

According to an embodiment an arrangement for lifting a tower wall portion of a wind turbine is provided, wherein the arrangement comprises a bar which is connectable to a coupling element of a lift; a first holding member comprising a first engagement portion which is adapted for engaging the tower wall portion at a first position; and a second holding member comprising a second engagement portion which is adapted for engaging the tower wall portion at a second position different form the first position, wherein the first holding member and the second holding member are (in particular releasably) lockable at the bar such that the first engagement portion and the second engagement portion are a first distance away from each other and wherein the first holding member and the second holding member are (in particular releasably) lockable at the bar such that the first engagement portion and the second engagement portion are a second distance away from each other, the second distance being different from the first distance.

The arrangement may be suitable for lifting an annular tower wall portion. In particular, the tower wall portion may have an annular cross-sectional shape, such as circular, polygonal (such as having 4, 6, 8 or more corners) or oval, or any other shape. In cross-section the tower wall portion may have a diameter which may range between 2 and 20 m, in particular 3 and 10 m, in particular around 5 m. The tower wall portion may in particular be manufactured from a metal, such as steel. The tower wall portion may have a height (in a longitudinal direction of the wind turbine tower) which may range between 3 and 100 m, in particular between 10 and 70 m, in particular between 30 and 60 m. A wall thickness of the tower wall portion may range between 2 cm and 10 cm, in particular between 3 cm and 5 cm.

The lift may for example comprise or be a crane and the coupling element may for example be a hook liftable by the crane.

The bar may be connectable to the coupling element of the lift in particular using a pad eye, a loop, a grommet or the like. In particular, the bar may be connectable to the coupling element in a detachable manner. The bar may have an elongated shape having a largest extent in a longitudinal direction. The bar may for example be manufactured from a metal, such as iron or steel. The bar may also be represented by a beam, a rod, a pole or the like. The length of the bar (along its longitudinal direction) may range between 2 m and 20 m, in particular between 4 m and 10 m. The length of the bar may depend on the diameter of the tower wall portion to be lifted. In particular, the length of the bar may be larger than a diameter of the tower wall portion to be lifted.

The bar may have a cross-sectional shape for providing a sufficient stiffness to withstand forces acting on the holding members and being transferred to the bar, when the tower wall portion is engaged by the engagement portions. In particular, the bar may have a cross-sectional shape, such as a T-shape, I-shape, U-shape, O-shape or any other shape providing a sufficient stiffness for holding and lifting a tower wall portion.

The first holding member and the second holding member may comprise portions for (in particular releasably) locking the first holding member and/or the second holding member at the bar. This may comprise at least one bolt. In particular, the first holding member and the second holding member may be slidable along the bar along the longitudinal direction of the bar. For locking the first holding member and/or the second holding member to the bar one or more bolts may be provided which may be inserted into one or more holes in the first holding member and/or in the second holding member and/or in the bar. In particular, the first holding member and/or the second holding member may comprise means for shifting the holding members along the bar and means for locking the holding members at the bar.

In particular, the first holding member and/or the second holding member may be lockable at predefined positions along the bar such that the first distance or the second distance is established between the first engagement portion and the second engagement portion. In an alternative embodiment the first holding member and/or the second holding member and/or the bar may be adapted such that the distance between the first engagement portion and the second engagement portion may continuously be adjusted such that the distance between the first engagement portion and the second engagement portion may be adjustable to any value between a minimum value, such as a few cm (such as 10 cm) and a maximum value (such as 15 m, in particular 10 m, further in particular 7 m).

The first holding member and the second holding member may be lockable at the bar in a detachable manner (both or only one of them) such that they may be locked at the bar and may be optionally released from the bar to be locked at another position along the bar (along the longitudinal direction of the bar). According to an embodiment only one of the first holding member and the second holding member may be lockable at the bar in a detachable manner, the other one may be lockable (or fixedly locked) at the bar in a non-detachable manner. Thereby, a locking mechanism may be provided which may provide catching, latching, clinching, engaging or registering the first holding member and/or the second holding member to the bar. The locking mechanism may for example comprise one or more springs, bolts, and the like.

The first engagement portion may be adapted to engage the tower wall portion at the first position, such as by inserting a bolt in a hole in the tower wall section or by shifting a surface portion of the engagement portion under an end flange of the tower wall portion. In particular, the first engagement portion and/or the second engagement portion may be brought in direct or indirect contact with regions of the tower wall portion at the first position and the second position, respectively. By the direct or indirect contact the gravity force of the tower wall portion may be transferred to the first engagement portion and the second engagement portion such that the tower wall portion hangs at the first position at the first engagement portion and hangs at the second position at the second engagement portion.

Thereby in particular the first engagement portion and/or the second engagement portion may be independent or separate from any displacement mechanism and/or locking mechanism provided by the first holding member and/or the second holding member and/or the bar. Thereby, a large flexibility may be provided for optimally adapting the structure, function, shape and constitution of the first engagement portion and/or the second engagement portion for providing their functions to engage the tower wall portion at different positions. In particular, the first holding member and/or the second holding member may be adapted as a claw. In particular, the first engagement portion and/or the second engagement portion may be adapted to engage the tower wall portion slightly below an upper end portion, such as a rim, a flange or a hole.

The arrangement for lifting the tower wall portion may represent an universal tower lifting tool comprising two or more engagement portions (in particular claws), preferably four engagement portions (in particular claws) which are displaceably attached to one or more bars (in particular beams) for adjusting the distance between the engagement portions to be adapted to a particular tower wall portion size (in particular diameter of the tower wall portion).

In particular, the claws may be locked to the end of the tower wall portion (in particular tower section) and the bars (in particular beams) by locking means. By providing that the distance between the first engagement portion and the second engagement portion is changeable from a first distance to a second distance being different from (in particular greater than) the first distance the arrangement for lifting a tower wall portion is suitable for lifting tower wall portions having different size (in particular having different diameters). Thereby, it may be avoided to provide several lifting tools each being adapted for lifting a tower wall portion having a particular size (in particular having a particular diameter). Thereby, assembling of a wind turbine tower wall may be simplified, in particular by reducing the required equipment and also by reducing assembly time and costs.

According to an embodiment the first holding member and/or the second holding member is slidable along the bar in a longitudinal direction of the bar. In particular, the bar and/or the first holding member and/or the second holding member may comprise one or more rollers and/or traces for guiding sliding the holding member(s) along the bar. In particular, the first holding member and/or the second holding member may manually be slid or may be slid using an actuator, such as a motor (in particular electric motor) or any hydraulic actuating equipment. Thereby, the adjusting the distance between the first engagement portion and the second engagement portion may be simplified. In particular the first holding member and/or the second holding member may be continuously slid along the bar. According to an embodiment only one of the first holding member and the second holding member is slidable along the bar, whereas the other of the first holding member and the second holding member is not slidable along the bar but is lockable (or fixedly locked) at the bar at a particular position.

According to an embodiment the first engagement portion and the second engagement portion are arrangeable for engaging the tower portion by increasing the distance between the first engagement portion and the second engagement portion. Thereby, the first engagement portion and the second engagement portion may engage the tower wall portion from an inside, in particular at a rim or flange protruding from the tower wall portion inwards. In particular, by increasing the distance between the first engagement portion and the second engagement portion the engagement portions and thereby the arrangement for lifting the tower wall portion may be locked or secured to the tower wall portion thus preventing or hindering the tower wall portion from falling down. In particular, the locking the tower wall portion to the arrangement for lifting the tower wall portion may be stably achieved by increasing the distance between the first engagement portion and the second engagement portion, in particular involving clamping radially outer portions of the holding members between inner surfaces of the tower wall portion.

According to an embodiment the first engagement portion and/or the second engagement portion is adapted for engaging a flange arranged at the tower wall portion. A flange may provide a connection portion of the tower wall portion to connect to a further tower wall portion to be placed on top of the tower wall portion. The flange may in particular comprise a rim or bulge protruding from a main (in particular inner) surface of the tower wall portion (outwards or inwards) such that an edge is formed at an upper end of the tower wall portion which has a larger width than a thickness of the tower wall portion. The protruding portion may serve as an engagement location where the engagement portions are brought in contact with the wall portions.

In particular, the flange may comprise one or more holes for inserting one or more bolts for connecting the tower wall portion to a further tower wall portion placed on top of the tower wall portion (in particular at the flange). In particular, the flange protrudes from a main surface (inside surface or outside surface) of the tower wall portion such that the first engagement portion and/or the second engagement portion may be placed below the protrusion for engaging the tower wall portion. Thereby, a simple way of engaging the tower wall portion may be provided.

According to an embodiment the flange protrudes inwardly from the tower wall portion. Thereby, the arrangement for lifting the tower wall portion may be arranged relative to the tower wall portion such that the bar is arranged above an upper surface (in particular annular surface) of the tower wall portion and such that the first engagement portion and the second engagement portion are arranged within the annular tower wall portion below the lower surface of the flange protruding inwardly from the tower wall portion. For engaging the tower wall portion the first engagement portion and the second engagement portion may be shifted away from each other (along the bar) such that the engagement portions lie under the lower surface of the flange, thereby possibly touching the inside surface of the tower wall portion. By latching or otherwise locking a slidability of the first engagement portion and the second engagement portion relative to each other the engagement of the tower wall portion may be locked. Thereby, a secure equipment for lifting the tower wall portion may be provided.

According to an embodiment the arrangement for lifting a tower wall portion further comprises a displacement actuator 144 which is adapted to displace the first holding member and the second holding member relative to each other. Although in other embodiments the first holding member and the second holding member may manually be displaced relative to each other, the displacement actuator 144 may provide a force of a machine or an arrangement such that the technician using the arrangement for lifting a tower wall portion does not personally need to apply the force or energy for displacing the holding members relative to each other by using his or her muscle forces. Thereby, utilizing the arrangement for lifting the tower wall portion may be simplified and may be performed by a person which can not apply sufficient muscle forces.

According to an embodiment the displacement actuator comprises a hydraulic actuator and/or an electric actuator. The electric actuator may for example comprise an electric motor and the hydraulic actuator may comprise a compressor for compressing oil to be delivered to a cylinder or/and piston for displacing the holding members relative to each other. Thereby, effective and cost-effective displacement actuators may be provided.

According to an embodiment the arrangement for lifting the tower wall portion further comprises a locking actuator 145 which is adapted for locking the first holding member and/or the second holding member at the bar. Although the locking may according to an embodiment be manually performed (such as by latching, inserting a bolt, and the like), the locking actuator 145 may simplify the locking such as also an unskilled person is able to successfully use the arrangement for lifting the tower wall portion.

According to an embodiment the locking actuator comprises a hydraulic actuator and/or an electric actuator.

According to an embodiment the arrangement for lifting a tower wall portion is adapted such that the first engagement portion and the second engagement portion engage an annular upper end portion of the tower wall portion at the first position and the second position, which are opposite to each other. In particular, the distance between the first position and the second position may substantially be equal to a diameter of the tower wall portion at the upper end portion of the tower wall portion measured between a region of the inside surface of the tower wall at the first position and a region of the inside tower wall at the second position. Thereby, the first engagement member and the second engagement member may engage at two positions being maximally spaced apart from each other. Thereby, a risk that the first engagement portion and/or the second engagement portion slips from the first position and/or the second position (in particular at a lower portion of the flange) is reduced or avoided, since the first engagement portion and the second engagement portion is hindered from shifting along the inner surface of the tower wall portion (except when both engagement portions shift according to a rotation movement). Thereby, a safety of the lifting arrangement may be improved.

According to an embodiment a method for lifting a tower wall portion of a wind turbine is provided, wherein the method comprises adjusting a first distance between a first engagement portion comprised in a first holding member and a second engagement portion comprised in a second holding member; engaging the tower wall portion using the first engagement portion at a first position and using a second engagement portion at a second position; locking the first holding member at a bar and/or locking the second holding member at the bar; and lifting the bar using a lift via a coupling element connected to the bar, thereby lifting the tower wall portion.

According to an embodiment the method for lifting a tower wall portion further comprises changing the first distance between the first engagement portion and the second engagement portion to a second distance different from the first distance; engaging a further tower wall portion using the first engagement portion at a further first position and using the second engagement portion at a further second position; further locking the first holding member at the bar and/or further locking the second holding member at the bar; and further lifting the bar using a lift via a coupling element connected to the bar, thereby lifting the further tower wall portion.

Herein, the further tower wall portion may have a different (in particular smaller or greater) diameter compared to the diameter of the tower wall portion (lifted before). In particular, the further tower wall portion may have a smaller diameter than the tower wall portion, in particular when measured from opposite portions of the inside surface of the respective tower wall portion. Thereby, a tower wall having a diameter decreasing with increasing height may be assembled. In particular, the tower wall portion and the further tower wall portion may have different circumference. In spite of that only one and the same arrangement for lifting a tower wall portion may be used for lifting both tower wall portions having different circumference or having different diameter. Thereby, a lot of manually handling may be save, as the tower lifting tool or arrangement for lifting a wall portion may be attachable by remote control of the tool.

According to an embodiment the first holding member and/or the second holding member is slid along the bar for changing the distance between the first engagement portion and the second engagement portion.

According to an embodiment the engaging the tower wall comprises arranging the first engagement portion below a flange at the tower wall portion at the first position and arranging the second engagement portion below a flange at the tower wall portion at the second position, the second position being in particular arranged opposite to the first position.

According to an embodiment at least one of the described method steps such as the engaging the tower wall portion and/or the further tower wall portion; the locking and/or further locking, and/or the lifting and/or further lifting may be remote controlled.

According to an embodiment the lifting arrangement may also be used to lift a whole assembled tower wall comprising several tower sections or tower portions. In this way, it may not be necessary to have a further separate tower lifting tool that is able to lift a whole tower wall and which normally may take additional time to be installed in a secure way with many bolts to be attached.

A displacement of the engagement members (in particular claws) may be done by actuating means or just be manual displacement, e.g. on the ground, when the tower section is lying down (such as at a truck). The actuating means may comprise hydraulic or/and electrical means for actuating a motor, a piston and/or a valve or similar means. The locking means or locking actuator may comprise similar hydraulic and/or electrical actuating means. The locking means may also comprise mechanical means such as one or more bolts or similar or means or mechanical means which may be mechanically actuated when the tower is lifted.

The locking means may be an integrated part of the displacement of the engagement portions (in particular claws) in such a way that the engagement portions are automatically locked to the end of a tower section (tower portion) when they are displaced.

In particular, the lifting tool or arrangement for lifting a tower wall portion may be used offshore, in particular where a tower is assembled from several tower sections.

The tower lifting tool or lifting arrangement may comprise one or more sensors for monitoring the displacement and/or the locking of the engagement portions (in particular claws). These sensors may be connected wirelessly or by using a wire (electrical or optical fibre) to a computer or controller for monitoring the sensors.

In particular, the displacement and/or the locking the engagement portions (in particular claws) may be actuated remotely.

In an embodiment the tower lifting tool comprises two beams (bars) each having two displaceably attached engagement portions (claws). One of the beams may be divided into two detachable and/or hinged beams. By removing one or more bolts or similar connection means the detachable and/or hinged beams may be able to be pivoted (or folded) in parallel with the other beams. In this way transportation of the tower lifting tool may be simplified as it may take up less space and room compared to a required space of conventional lifting tools.

The tower lifting tool or lifting arrangement may be capable to connect to a tower or to a tower section having a separate tower end part or cover. This cover may be connected to the end part of the tower section, to protect the inside of the tower against rain, snow, salty water and dirt from the ambient environment where the tower or tower section is trans-ported or stored.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

FIG. 7 schematically shows an arrangement for lifting a tower wall portion attached to an upper end of a tower wall (portion) according to an embodiment;

FIG. 8 schematically illustrates an arrangement for lifting a tower wall portion as attached to another tower wall (portion) having a smaller diameter compared to the tower wall portion depicted in FIG. 7.

DETAILED DESCRIPTION

Figure 1:
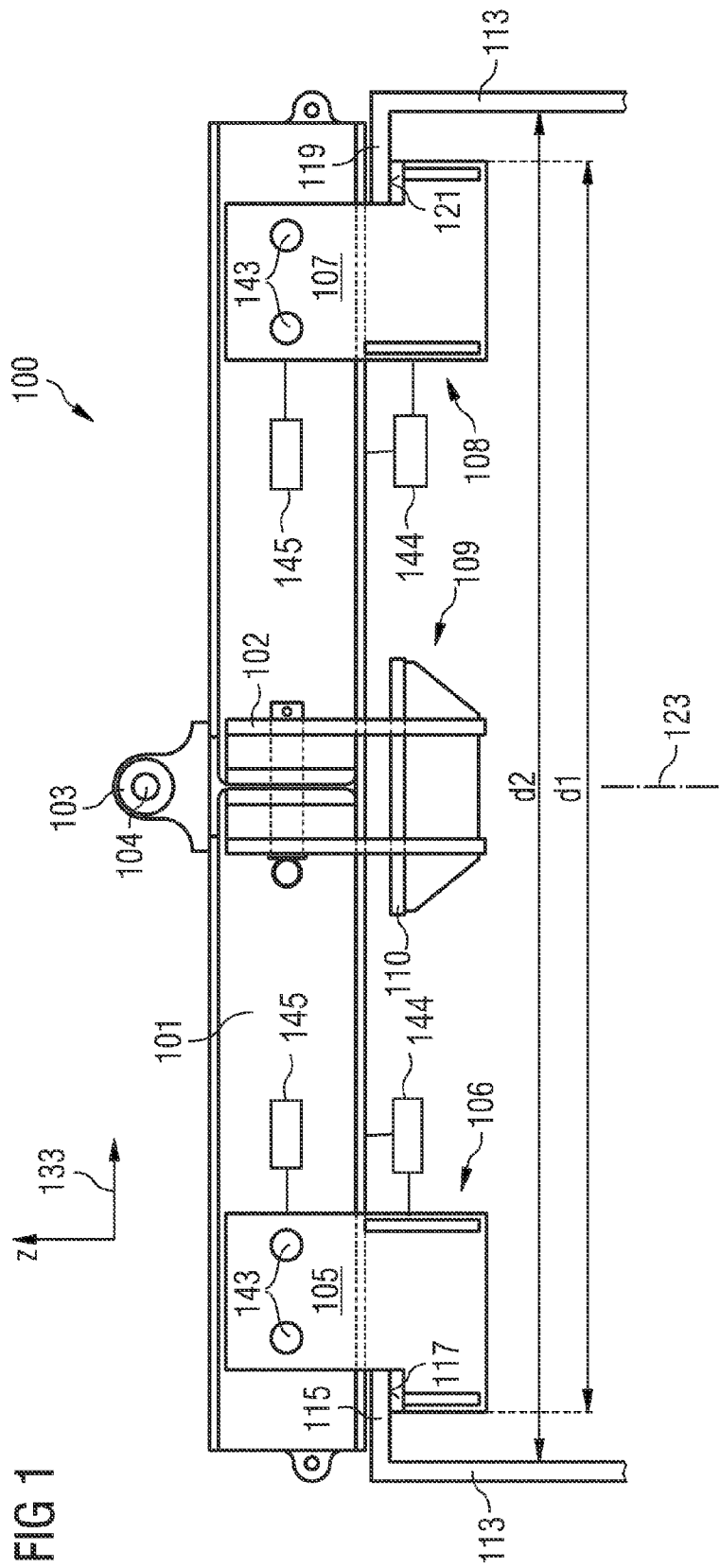
FIG. 1 schematically shows a side view of an arrangement for lifting a tower wall portion according to an embodiment.

The illustration in the drawing is schematically. It is noted that in different figures, similar or identical elements are provided with the same reference signs or with reference signs, which are different from the corresponding reference signs only within the first digit.

FIG. 1 schematically illustrates a side view of an arrangement 100 for lifting a tower wall portion of a wind turbine according to an embodiment.

The arrangement 100 comprises a bar 101 having a longitudinal axis 133 along which the bar extends to a largest extent. The bar 101 is manufactured using a metal, such as steel. The bar 101 further comprises a pad eye 103 having a hole 104 into which a hook of a crane may be inserted for lifting the arrangement 100. The bar has, in the illustrated embodiment, an I-shape in cross-section perpendicular to the drawing plane of FIG. 1. During operation the longitudinal axis 133 runs along a horizontal direction, whereas the vertical direction is indicated by the z-axis.

The arrangement 100 for lifting a tower wall portion further comprises a first holding member 105, a second holding member 107, a third holding member 109 and a not illustrated fourth holding member 111. The third holding member 109 and the fourth holding member 111 are arranged at a second bar 102 having its longitudinal axis arranged perpendicular to the drawing plane of FIG. 1. The first holding member 105 and the second holding member 107 are slidable along the bar 101 in the longitudinal direction 133. The first holding member 105 and the second holding member 107 are lockable to the bar 101 at a particular position along the longitudinal axis 133 using bolts 143. Tightening the bolts 143 ensures that the first holding member 105 and the second holding member 107 does not change their positions along the longitudinal axis 133 such that they are fixed to the bar 101 at selectable positions along the longitudinal axis 133.

The first holding member 105 comprises a first engagement portion 106 for engaging a tower wall portion 113 below a flange region (or rim portion) 115. Thereby, an upper engagement surface 117 of the first engagement portion 106 may be brought in contact with a lower surface of the flange region 115 protruding inwards towards an inside of the turbine tower. Opposite to the flange region 115 the tower wall portion 113 comprises a flange region 119 which is engaged by a second engagement portion 108 comprised in the second holding member 107. In particular, an engagement surface 121 of the second engagement portion 108 is in direct contact with a lower surface of the flange region 119 to thus hold the tower wall portion 113 at the flange region 119.

A longitudinal axis of the tower wall is indicated by reference sign 123. Although not illustrated in FIG. 1 other rim portions of the tower wall portion 113 are supported or engaged by a third engagement portion 110 of the third holding member 109 and a fourth engagement portion 112 of the fourth holding member 111. Thereby, the tower wall portion 113 is supported or engaged at four different regions at an inwardly facing (protruding) flange of the tower wall portion 113, wherein the four regions are circumferentially spaced apart by approximately 90°. Thereby, the tower wall portion 113 may securely be hold and supported such that lifting of the tower wall portion 113 may be performed in a secure way.

Figure 2:
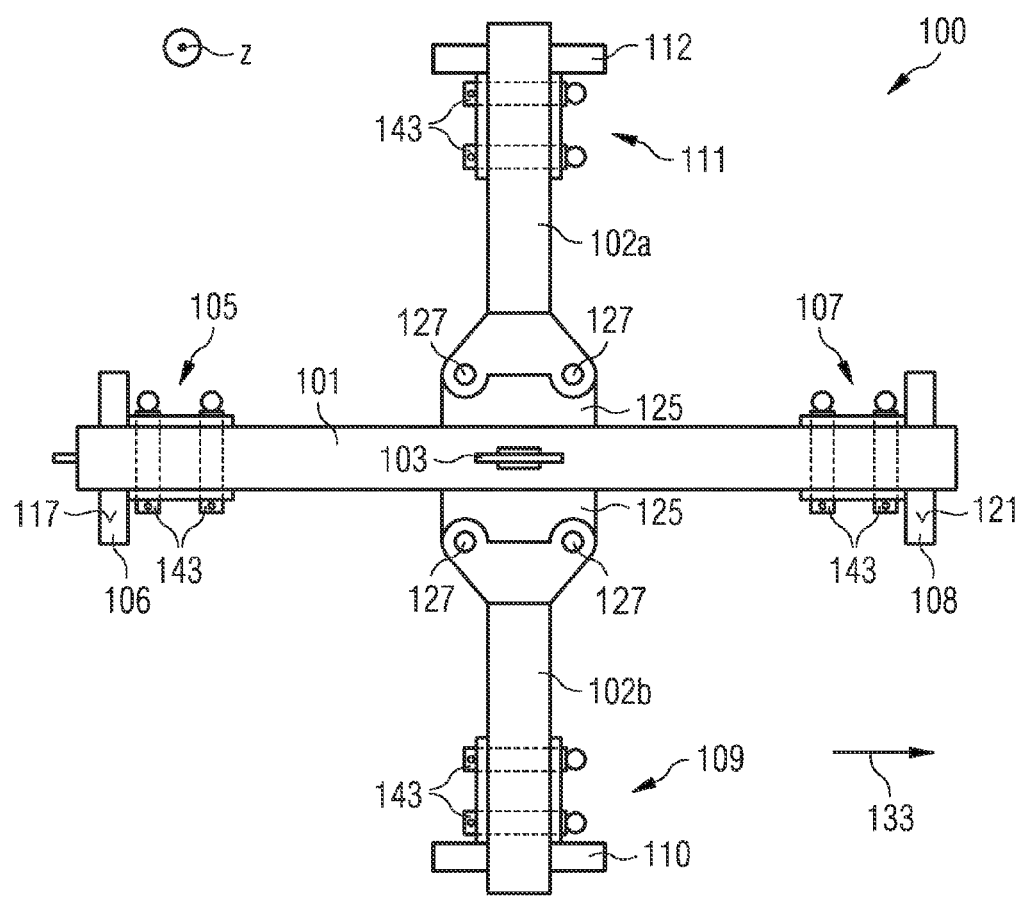
FIG. 2 schematically illustrates a top view of the arrangement for lifting a tower wall portion illustrated in FIG. 1.

FIG. 2 schematically illustrates a top view of the arrangement 100 for lifting a tower wall portion illustrated in FIG. 1. The view of FIG. 2 is in the vertical direction z. As can be seen from FIG. 2, the second bar 102 comprises two portions 102a, 102b which are connected to each other via a connection member 125. The connection member 125 comprises joints or bolts 127 which may enable to disassemble the bar 102 into two parts 102a, 102b or which may be adapted as hinges around which the two arms 102a, 102b of the second bar 102 may be turned such that they are oriented parallel to the bar 101.

In particular, the two bars 101, 102 may be separated from each other or may remain connected to each other such that they are oriented along a similar direction, for example for transportation. In particular, by removing one or more bolts 127 or similar connection means the detachable and/or hinged bars 101, 102 or beams may be able to be pivoted in parallel with each other. Thereby, transportation of the arrangement for lifting a tower wall portion may be simplified requiring less space.

Figure 3:
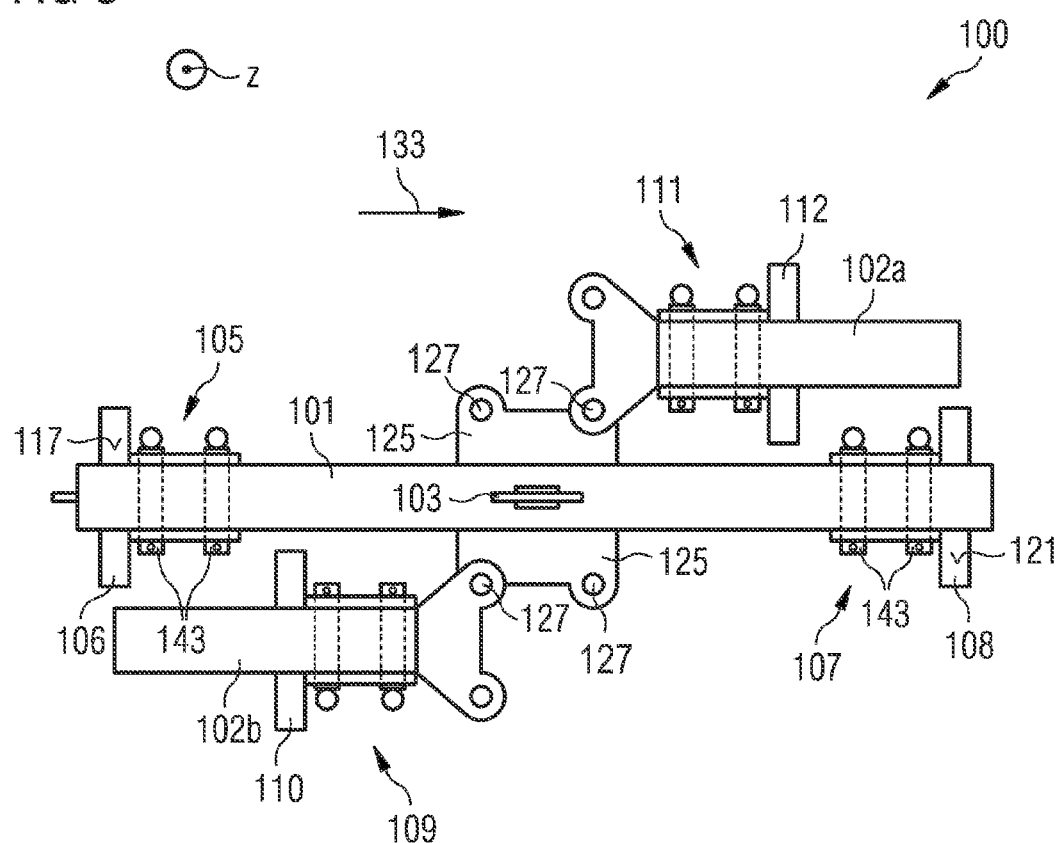
FIG. 3 schematically shows a top view of the arrangement for lifting a tower wall portion illustrated in FIG. 1 and FIG. 2, in a collapsed (or folded) configuration adapted for transportation.

FIG. 3 schematically illustrates a top view of the arrangement 100 for lifting a tower wall portion illustrated in FIGS. 1 and 2 in a compacted (or folded) configuration, wherein the second bar portions 102a, 102b have been turned around the joints 127 such that the longitudinal axis of the portions of the second bar 102 is parallel to the longitudinal axis 133 of the bar 101. Thereby, the arrangement 100 requires less space which may simplify transportation of the lifting arrangement 100.

Figure 4:
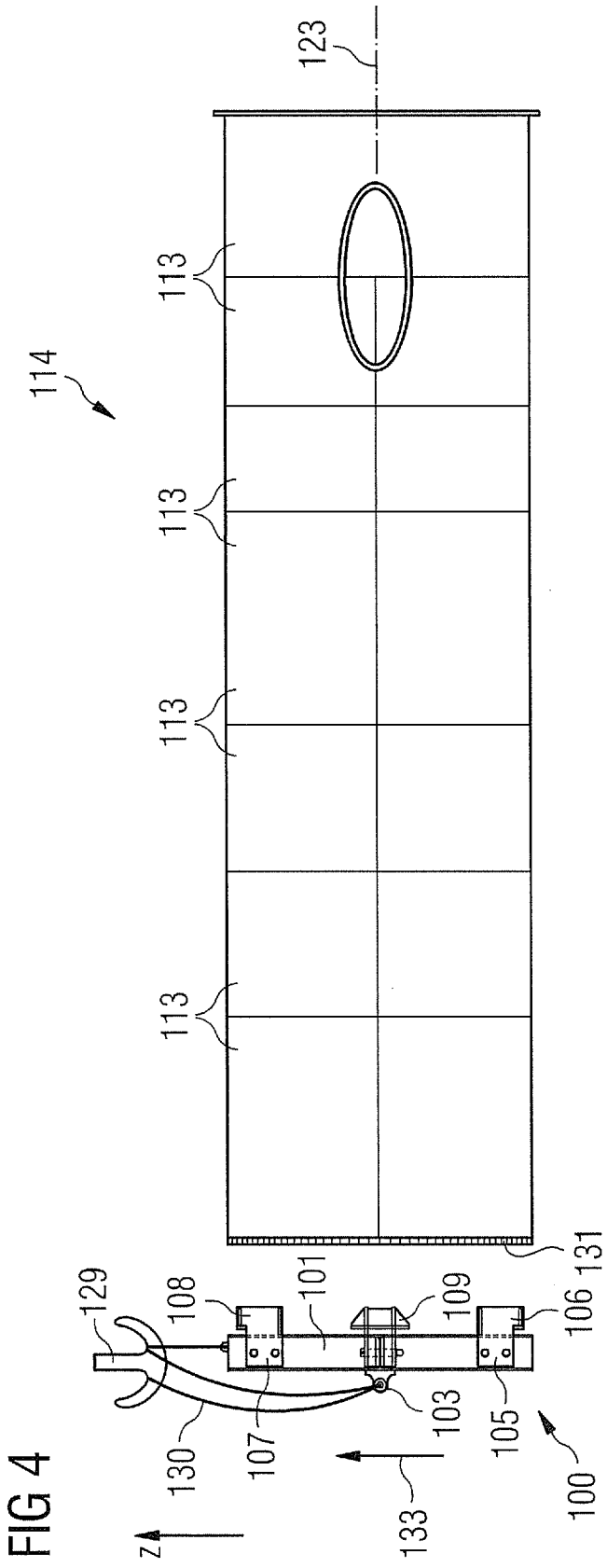
FIG. 4 schematically illustrates a method step in a method for lifting a tower wall portion according to an embodiment.

FIG. 4 schematically illustrates a method step for lifting a tower wall portion according to an embodiment. In the illustrated embodiment a part of a tower wall part or an entire tower wall 114 is lying having its longitudinal axis 123 oriented in the horizontal direction, such as when transported by a truck or a train. Using a crane to which a hook 129 is connected the arrangement 100 for lifting a tower wall portion illustrated in FIGS. 1-3 is brought in proximity to an upper end 131 of the tower wall part 114. Thereby, a rope 130 is guided through the hole 104 of the pad eye 103 to connect the arrangement 100 for lifting a tower wall portion to the hook 129.

Figure 5:
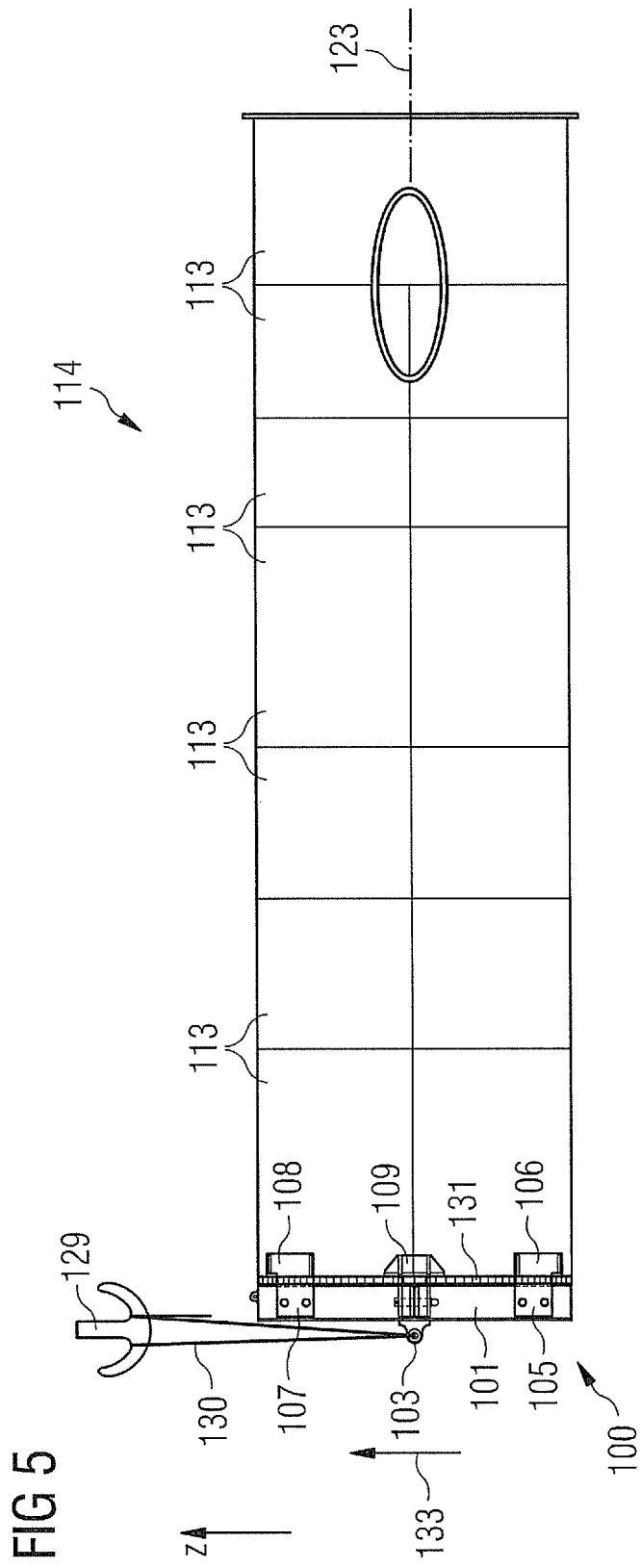
FIG. 5 schematically shows a further method step in a method for lifting a tower wall portion according to an embodiment.

In a next method step illustrated in FIG. 5 the arrangement 100 for lifting a tower wall portion engages a rim or flange of the tower part 114 (at an upper end 131 of the tower part 114) and is locked such that the arrangement 100 for lifting a tower wall portion is secured to the upper end 131 of the tower part 114.

Figure 6:
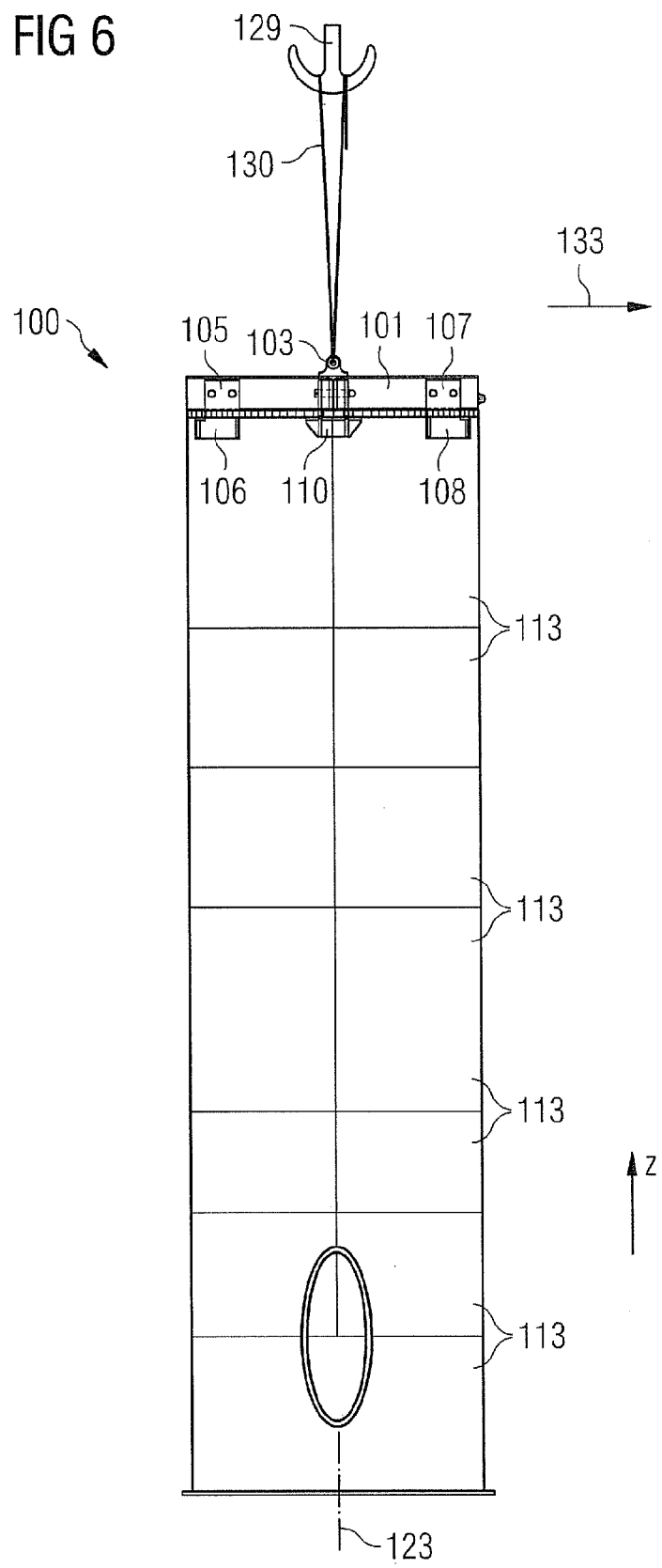
FIG. 6 schematically shows a further method step in a method for lifting a tower wall portion according to an embodiment.

In a next method step illustrated in FIG. 6 the crane has lifted the tower part 114 via the hook 129 and the arrangement 100 for lifting a tower wall portion and has oriented the tower part 114 such that its longitudinal direction 123 aligns with the vertical z-direction.

According to an embodiment a whole tower part is erected in this manner and installed at a particular location. According to an another embodiment further tower wall portions may be arranged on top of the tower part 114 and connected to the tower part 114 to complete the tower wall.

FIG. 7 schematically illustrates the tower part 114 as more tower wall portions have been built up and stacked on top of each other to increase the height of the tower part. Thereby, each tower wall portion, such a the one having a diameter d2, has been lifted using the arrangement 100 for lifting a tower wall portion.

FIG. 8 schematically illustrates how the arrangement 100 for lifting a tower wall portion illustrated in FIGS. 1-3 may also be used for lifting a tower wall portion 113 having a smaller diameter d2' than the diameter d2 of the tower wall portion 113 lifted according to the method step illustrated in FIG. 7.

For lifting the tower wall portion 113 illustrated in FIG. 8 the distance d1 (which may be substantially equal to d2 being the diameter of the tower wall portion 113) between the first engagement portion 106 and the second engagement portion 108 (compare FIG. 1) has been changed from the distance d1 as depicted in FIG. 7 to the distance d1' as depicted in FIG. 8 (which may be substantially equal to d2' being the diameter of the tower wall portion 113'). Thereby it was enabled that the first engagement portion 106 and the second engagement portion 108 engage different flange regions at an upper end of the tower wall portion 113 being opposite to each other. Further, the third and fourth engagement portions engage flange regions of the tower wall portion 113 being opposite to each other. Thereby, the arrangement 100 for lifting a tower wall portion enables securely lifting tower wall portions having different diameters by engaging the tower wall portions at four different regions (in particular at a flange at an upper end of the tower wall portion) spaced apart by 90° in a circumferential direction. In particular, the engagement portions may be adapted as claws.

It should be noted that the term "comprising" does not exclude other elements or steps and "a" or "an" does not exclude a plurality. Also elements described in association with different embodiments may be combined. It should also

The invention claimed is:

1. A method for lifting a tower wall portion of a wind turbine comprising an inwardly protruding flange region, the method comprising the steps of:
   adjusting a first distance between a first engagement portion comprised in a first holding member and a second engagement portion comprised in a second holding member;
   engaging the tower wall portion flange region using the first engagement portion at a first position and using the second engagement portion at a second position, wherein an upper engagement surface of the first and second engagement portions engage the lower surface of the inwardly protruding flange region of the tower wall portion;
   locking at least one of the first holding member and the second holding member at a bar; and
   lifting the bar using a lift via a coupling element connected to the bar, to lift the tower wall portion.

2. The method according to claim 1, further comprising the steps of:
   changing the first distance between the first engagement portion and the second engagement portion to a second distance different from the first distance;
   engaging a further tower wall portion using the first engagement portion at a further first position and using the second engagement portion at a further second position;
   further locking at least one of the first holding member and the second holding member at the bar; and
   further lifting the bar using a lift via a coupling element connected to the bar, thereby lifting the further tower wall portion.

3. The method according to claim 2, wherein at least one of the first holding member and the second holding member is slided along the bar for changing the distance between the first engagement portion and the second engagement portion.

4. The method according to claim 1, wherein the engaging the tower wall comprises arranging the first engagement portion below a flange at the tower wall portion at the first position and arranging the second engagement portion below a flange at the tower wall portion at the second position, the second position being in particular opposite to the first position.

5. The method according to claim 1, wherein at least one of the steps is remote controlled.

6. A method comprising:
   adjusting a distance between a first holding member and a second holding member on a bar to a first diameter smaller than a diameter of an inwardly projecting flange of a first tower wall portion;
   inserting the bar into the first tower wall portion;
   adjusting the distance between the first holding member and the second holding member on the bar to a second diameter larger than the first diameter and larger than the diameter of the inwardly projecting flange of the first tower wall portion; and
   lifting the first tower wall portion by engaging the first and second holding members against a lower surface of the inwardly projecting flange.

7. The method of claim 6, further comprising:
   adjusting the distance between the first holding member and the second holding member on the bar to a third diameter smaller than the diameter of the inwardly projecting flange of the first tower wall portion;
   removing the bar from the first tower wall portion;
   adjusting the distance between the first holding member and the second holding member to a fourth diameter smaller than a diameter of an inwardly projecting flange of a second tower wall portion;
   inserting the bar into the second tower wall portion;
   adjusting the distance between the first holding member and the second holding member to a fifth diameter larger than the fourth diameter and larger than the diameter of the inwardly projecting flange of the second tower wall portion; and
   lifting the second tower wall portion by engaging the first and second holding members against a lower surface of the inwardly projecting flange of the second tower wall portion.

* * * * *